United States Patent
Hamaguchi et al.

(10) Patent No.: US 8,016,339 B2
(45) Date of Patent: Sep. 13, 2011

(54) VEHICLE EQUIPPED WITH FLOOR MAT FOR LOADING PLATFORM

(75) Inventors: Kazumichi Hamaguchi, Saitama (JP); Naoto Ono, Saitama (JP); Satoshi Fukuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 652 days.

(21) Appl. No.: 12/042,130

(22) Filed: Mar. 4, 2008

(65) Prior Publication Data

US 2009/0224566 A1 Sep. 10, 2009

(51) Int. Cl.
*B62D 25/00* (2006.01)
*B61D 45/00* (2006.01)
(52) U.S. Cl. ...................... 296/39.2; 410/109
(58) Field of Classification Search ............... 296/39.2, 296/193.07, 187.08, 184.1, 29, 97.23; 52/177, 52/578; 410/101, 105, 106, 109
See application file for complete search history.

(56) References Cited

U.S. PATENT DOCUMENTS

| | | | |
|---|---|---|---|
| 5,046,775 A * | 9/1991 | Marcum et al. | 296/39.2 |
| 5,180,263 A * | 1/1993 | Flowers, Jr. | 410/106 |
| 5,738,471 A * | 4/1998 | Zentner et al. | 410/110 |
| 6,196,777 B1 * | 3/2001 | Price | 410/102 |
| 6,578,896 B1 * | 6/2003 | Peterson | 296/97.23 |
| 6,808,217 B2 * | 10/2004 | Nick et al. | 296/26.08 |
| 7,025,524 B2 * | 4/2006 | Vitoorapakorn et al. | 403/408.1 |
| 2005/0040676 A1 * | 2/2005 | Kikuchi | 296/193.07 |

* cited by examiner

*Primary Examiner* — Glenn Dayoan
*Assistant Examiner* — SunSurraye Westbrook
(74) *Attorney, Agent, or Firm* — Arent Fox LLP (57) ABSTRACT

A floor mat for a loading platform placed on an upper surface of a floor of the loading platform of a vehicle. The floor mat is provided with a plurality of retaining holes formed near an edge of the floor surface and through which at least one load securing tool is inserted.

7 Claims, 8 Drawing Sheets

VEHICLE EQUIPPED WITH FLOOR MAT FOR LOADING PLATFORM

BACKGROUND OF THE INVENTION

1. Field of the Invention

The present invention relates to a floor mat for a loading platform and a vehicle equipped therewith.

2. Description of the Related Art

U.S. Pat. No. 5,551,742 discloses a conventional floor mat and a vehicle equipped therewith.

The disclosed conventional floor mat is formed in accordance with the shape of a loading platform. The floor mat is secured to the loading platform by securing members such as screws or rivets. Therefore, many securing components are needed, making mounting and removal of the floor mat troublesome.

SUMMARY OF THE INVENTION

The present invention is achieved in view of such circumstances, and provides a floor mat that can easily be secured to a loading platform without requiring optional or additional securing members, and thus can easily be removed, and also to provide a vehicle equipped with such a floor mat.

The floor mat of the present invention includes a plurality of retaining holes. A plurality of load securing tools are inserted through corresponding retaining holes for securing items on the loading platform. Also, when the retaining holes contract back to their original shape after the corresponding load securing tools pass therethrough, the floor mat is secured to the loading platform.

As such, the floor mat of the present invention is easily secured on the floor of the loading platform without using any optional or additional securing members, thereby reducing the number of parts, cost thereof, and manufacturing steps.

It is preferable that the periphery of the retaining holes of the floor mat be made of an elastic material so that a plurality of load securing tools are easily inserted through corresponding retaining holes by simply elastically expanding the hole. Thus, the floor mat is more securely retained on the loading platform.

A vehicle according to the present invention, which is provided with the aforementioned floor mat, includes a support member having a base portion secured to the floor, a boss portion continuously connected to one end of the base portion, and a hook member having a width greater than a width of the support member. The width of the retaining hole is greater than the width of the support member, but less than the width of the hook.

Because the hook member is exposed through the corresponding retaining holes of the floor mat, the hook member can be used to secure items.

Preferably, the vehicle provided with the aforementioned floor mat also includes a pair of bumps that are arranged for the load securing tools therebetween on the floor of the loading platform. Upper bumps, which receive the bumps on the floor, are formed on an underside of the floor mat as a recess at a portion corresponding to the bumps on the floor.

Therefore, even when a load to be placed on the floor is placed immediately above the load securing tool, the upper bumps receive the load to prevent interference between the load and the load securing tool and prevent damage to the load. Furthermore, the floor mat is prevented from slipping or sliding across the floor surface.

It is preferable that the floor mat of the present invention is made of a material having a vibration preventing or damping property, elasticity and slip preventing properties.

DESCRIPTION OF THE PREFERRED EMBODIMENT

Now, a preferred embodiment of the present invention will be described with reference to the accompanying drawings.

Figure 1:
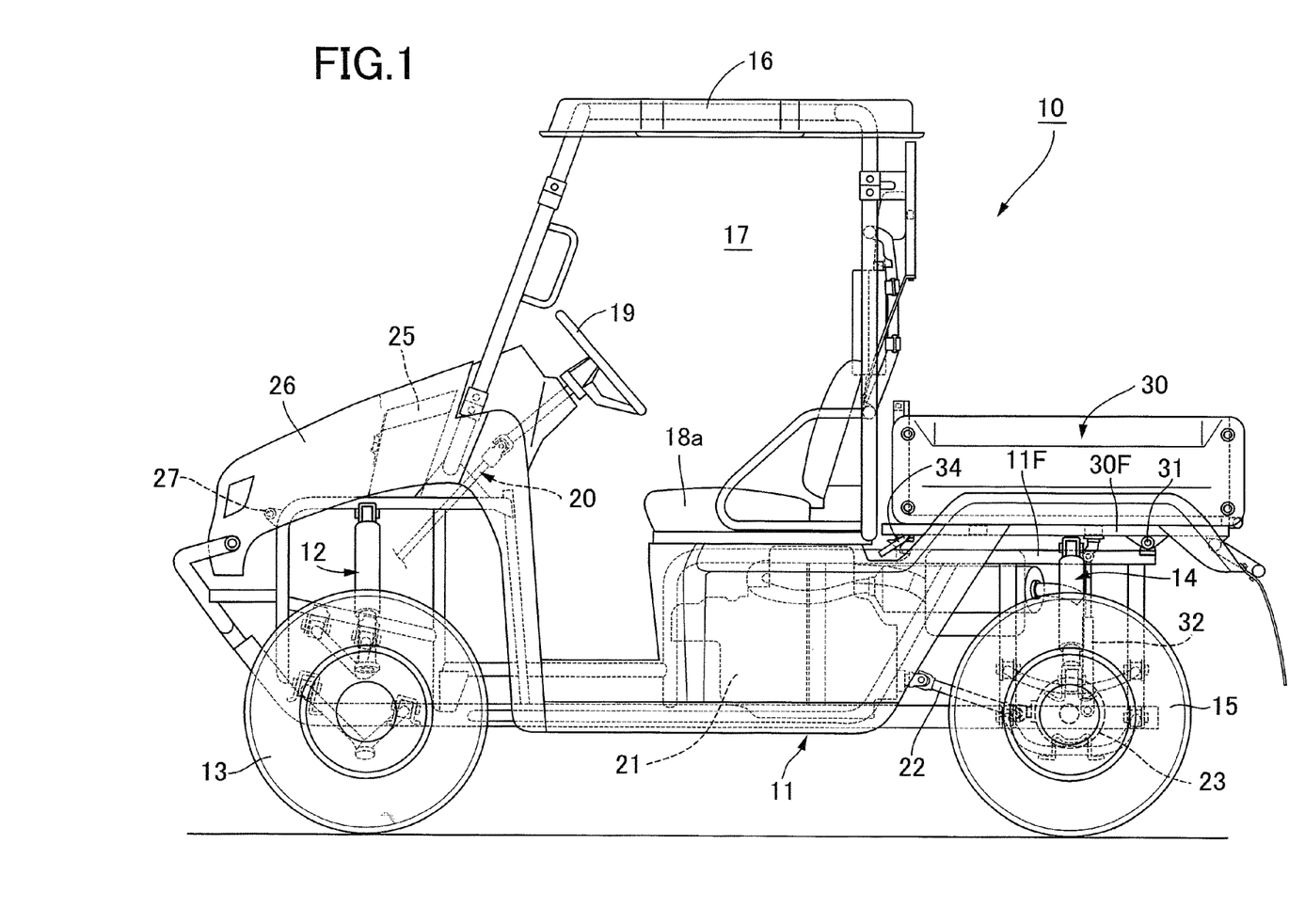
FIG. 1 is a side view of a vehicle including a floor mat device for a loading platform according to the present invention.
Figure 2:
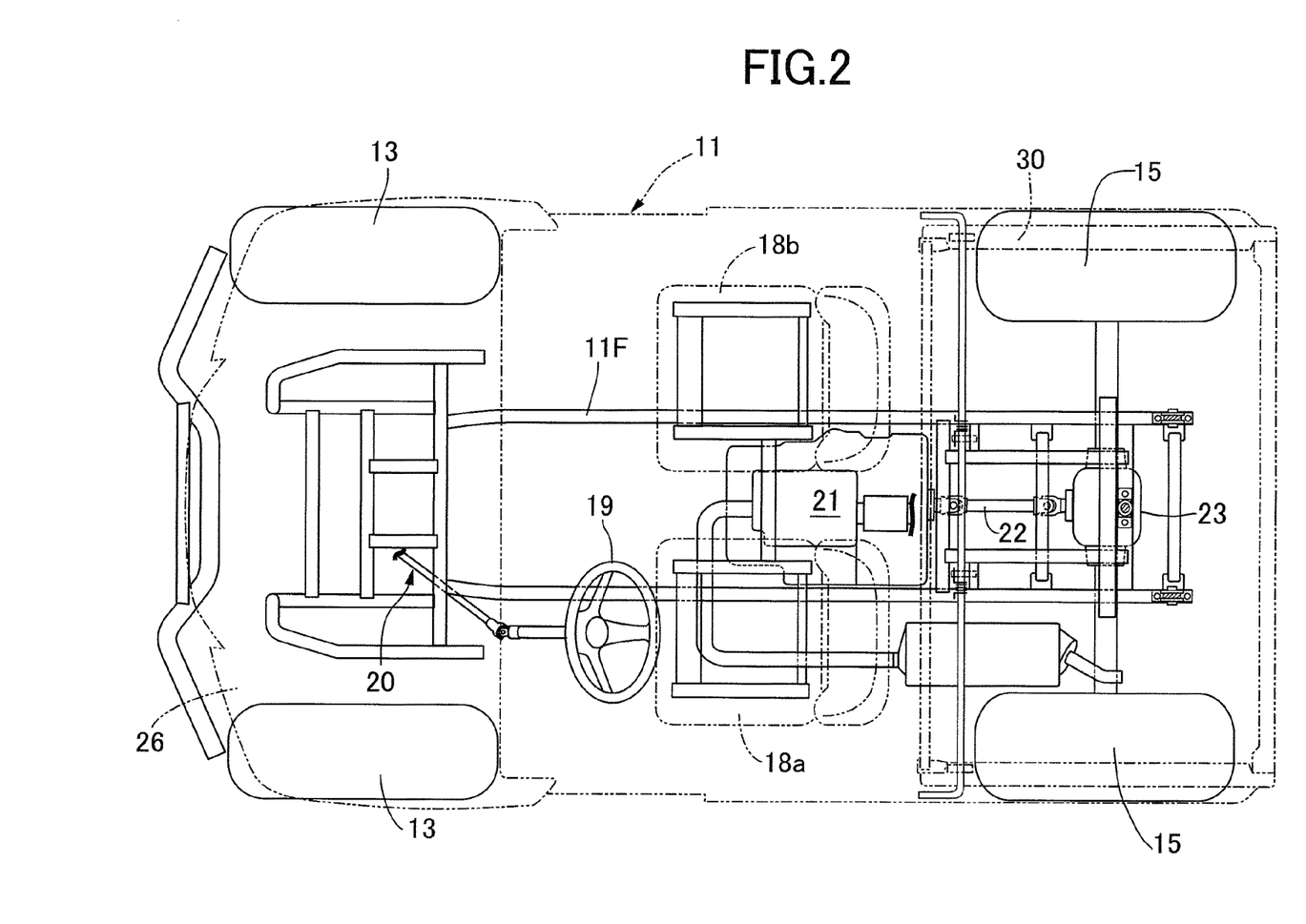
FIG. 2 is a plan view of the vehicle in FIG. 1 with essential portions of a vehicle body removed.

In FIGS. 1 and 2, reference numeral 10 denotes a multi-purpose truck as a vehicle. The truck 10 includes a pair of left and right front wheels 13 and 13 suspended in a front portion of a vehicle body 11 by a front suspension 12, and a pair of left and right rear wheels 15 suspended in a rear portion of the vehicle body 11 by a rear suspension 14. To each wheel, a low pressure tire called a balloon tire is mounted. In a middle portion of the vehicle body 11, a cabin 17 with a roof 16 is formed.

In the cabin 17, a pair of left and right seats 18a and 18b, and a steering wheel 19 facing one driver seat 18a are provided, and the steering wheel 19 is steerably joined to the front wheels 13 via a steering mechanism 20. Below the left and right seats 18a and 18b, a power unit 21 including an engine is mounted in a frame 11F of the vehicle body 11, and power of the power unit 21 is transmitted to the rear wheels 15 via a propeller shaft 22 and a differential gear 23.

Figure 3:
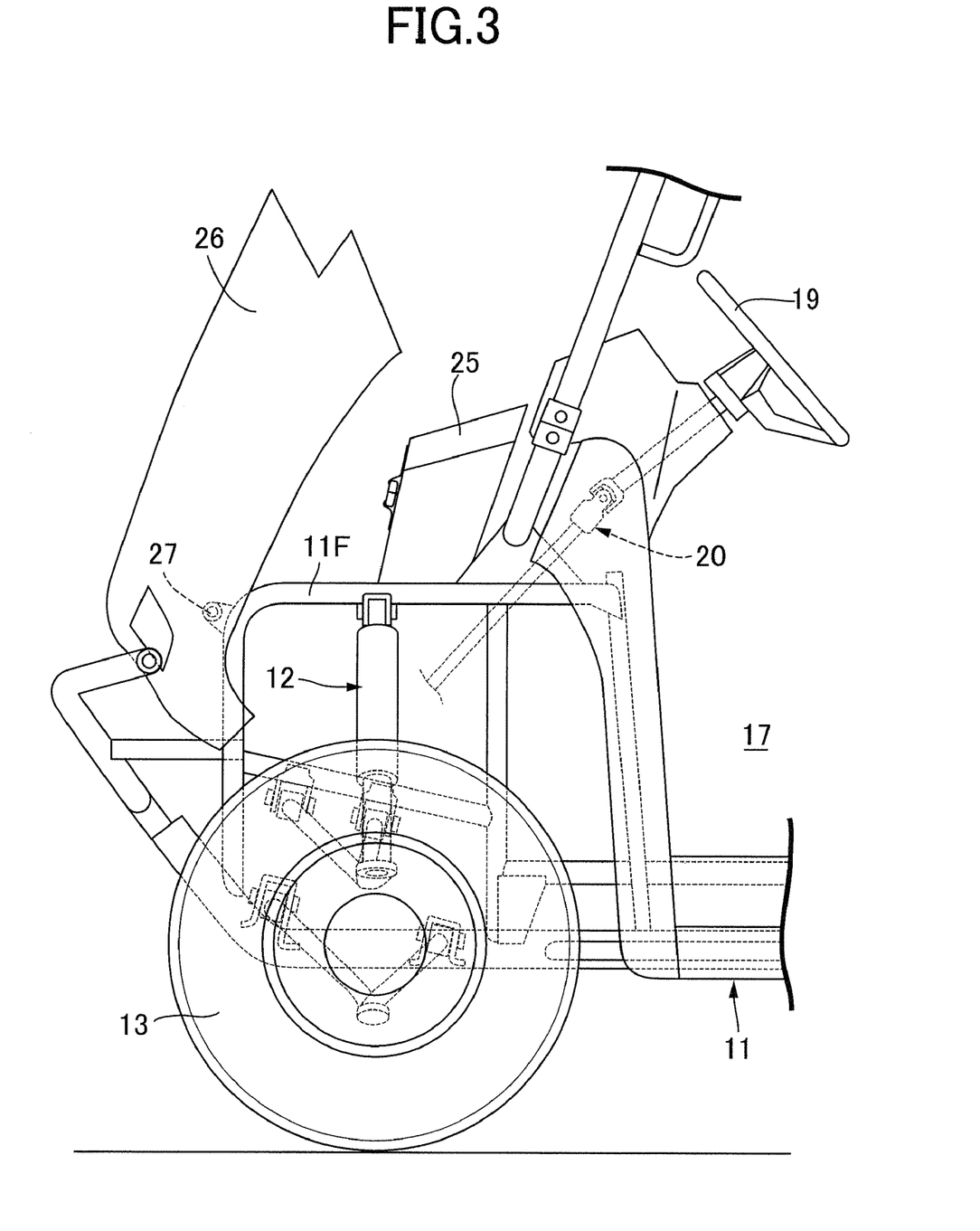
FIG. 3 is a side view of a front portion of the vehicle in FIG. 1 with a front hood opened.

As shown in FIGS. 1 and 3, in the front portion of the vehicle body 11, a housing box 25 is mounted that houses tools or other small articles and placed in a space around the steering mechanism 20. A front hood 26 covering the housing box 25, the steering mechanism 20, and the front wheels 13 from above is openably and closably joined to the frame 11F of the vehicle body 11 via a pivot 27.

Figure 4:
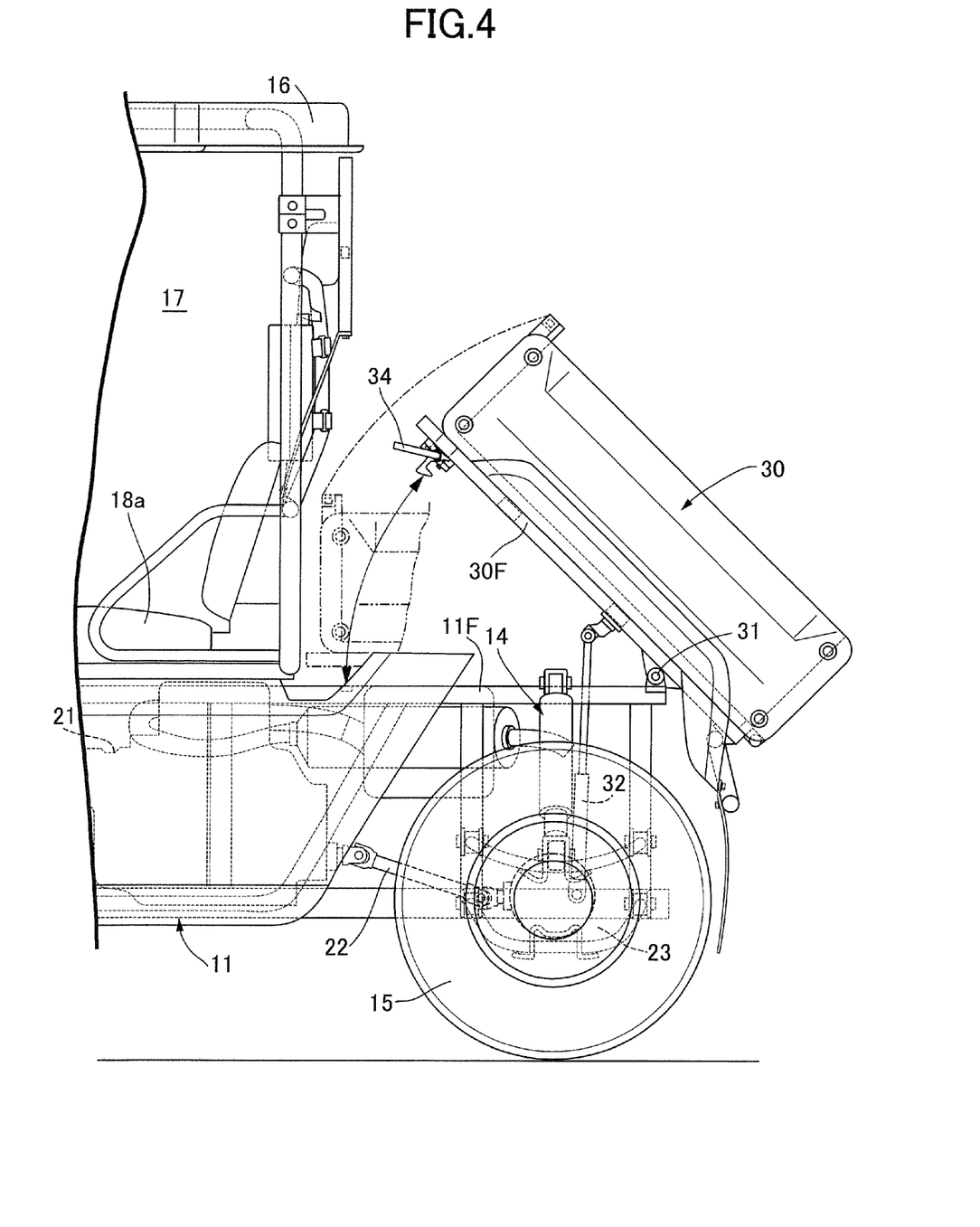
FIG. 4 is a side view of a rear portion of the vehicle in FIG. 1 in a dump state of the loading platform.
Figure 5:
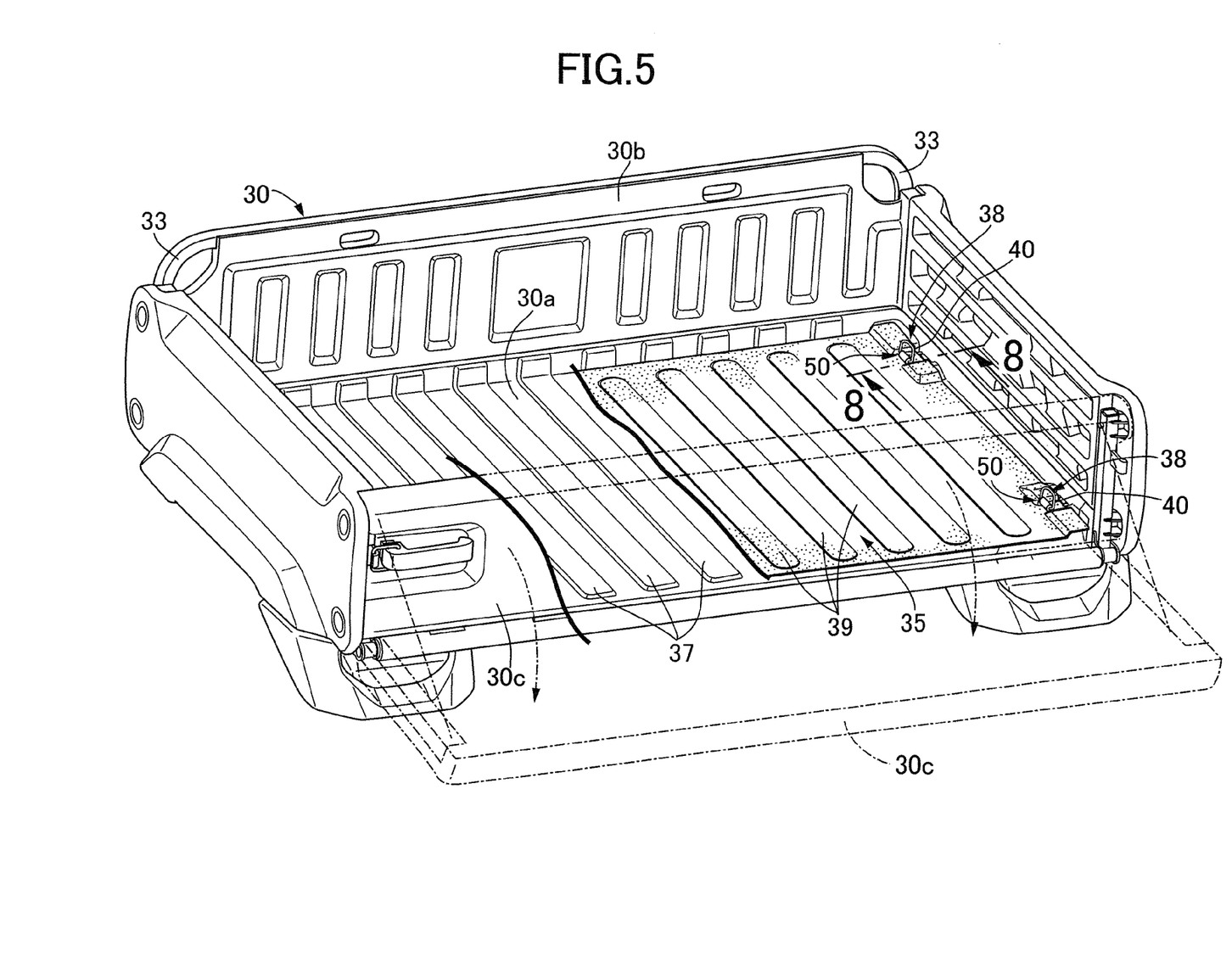
FIG. 5 is a rear perspective view of the loading platform with the floor mat placed thereon.
Figure 6:
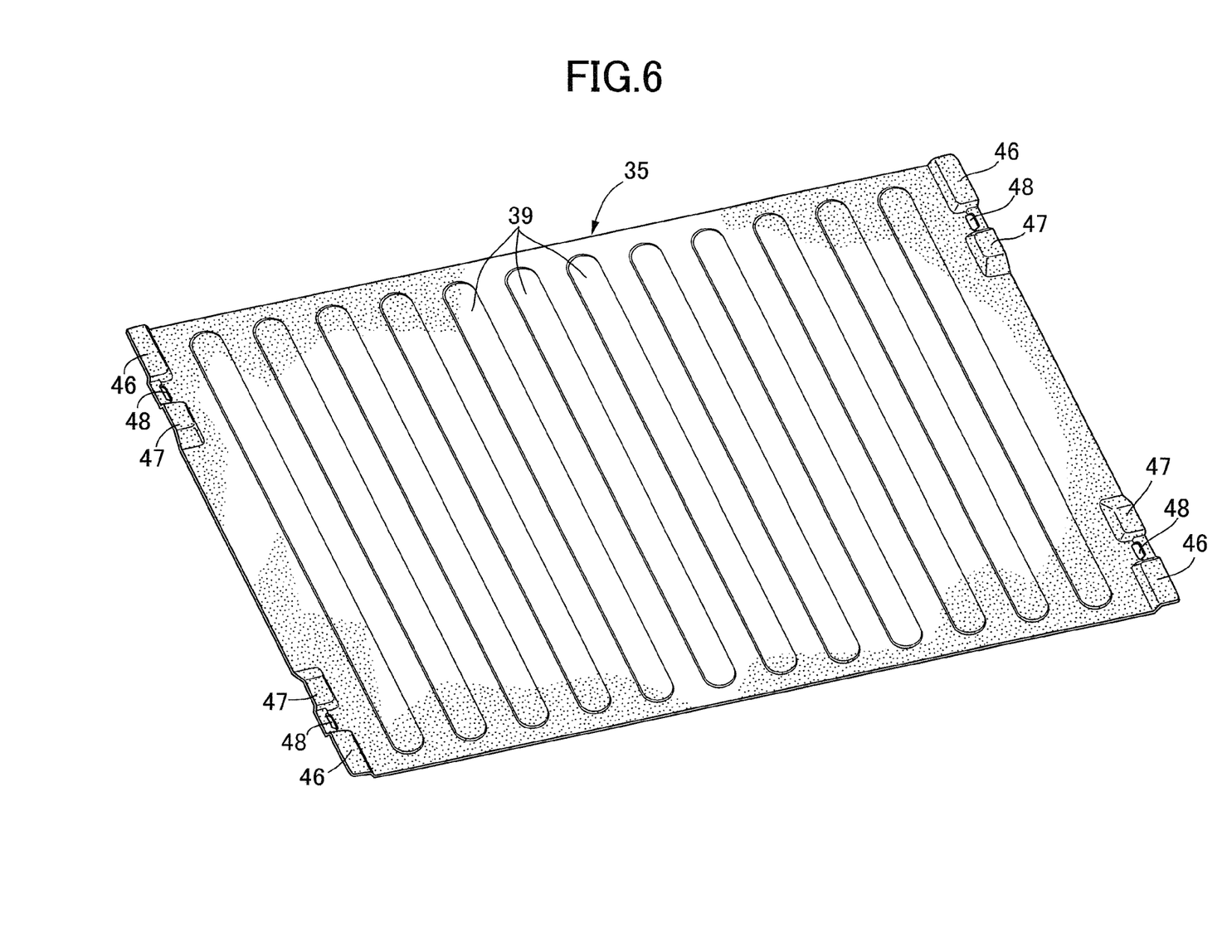
FIG. 6 is a perspective view of the floor mat placed on the loading platform.

As shown in FIGS. 4 and 5, immediately above the rear wheels 15, a box-shaped loading platform 30 including an openable and closable rear gate 30c is mounted to the vehicle body 11 so as to be dumpable rearward. Specifically, the loading platform 30 includes a loading platform frame 30F extending in a front and rear direction of the truck 10 on a lower surface, and the loading platform frame 30F is joined to a rear end of the frame 11F of the vehicle body 11 via a pivot 31 so as to be dumpable rearward. The loading platform 30 can pivot around the pivot 31 between a normal position where the loading platform 30 is horizontally supported on the frame 11F of the vehicle body 11 and a dump position where the loading platform 30 is tilted rearward. At upper left and right corners in a front wall 30b of the loading platform 30, arcuate grips 33 used for a manual dump operation of the loading platform 30 are formed. Between the loading platform and the vehicle body 11, an auxiliary dumper 32 for assisting the dump operation of the loading platform 30 is mounted. In a lower portion at a front end of the loading platform 30, a manual lock device 34 is provided that can lock the loading platform 30 to the vehicle body 11 in the horizontal normal position.

As shown in FIG. 5, a floor 30a of the loading platform 30 is made of steel plate, and has a number of ribs 37, 37 . . . extending in the front and rear direction of the truck 10. On the floor 30a, a pair of front and rear load securing tools 38 and 38; 38 and 38 are provided on left and right sides. As clearly shown in FIGS. 7 and 8, each load securing tool 38 includes a support member 39 mounted to the floor 30a, and a hook member 40 supported by the support member 39. The support member 39 includes a base portion 39a, and a boss portion 39b continuously connected to one end of the base portion 39a. The hook member 40 is formed of a D-ring, and a straight-shaped shaft 40a thereof is rotatably supported by the boss portion 39b. At this time, between the shaft 40a and the boss portion 39b, friction is applied such that the hook member 40 can be held in a horizontal position, any tilted position, and a standing position.

Figure 7:
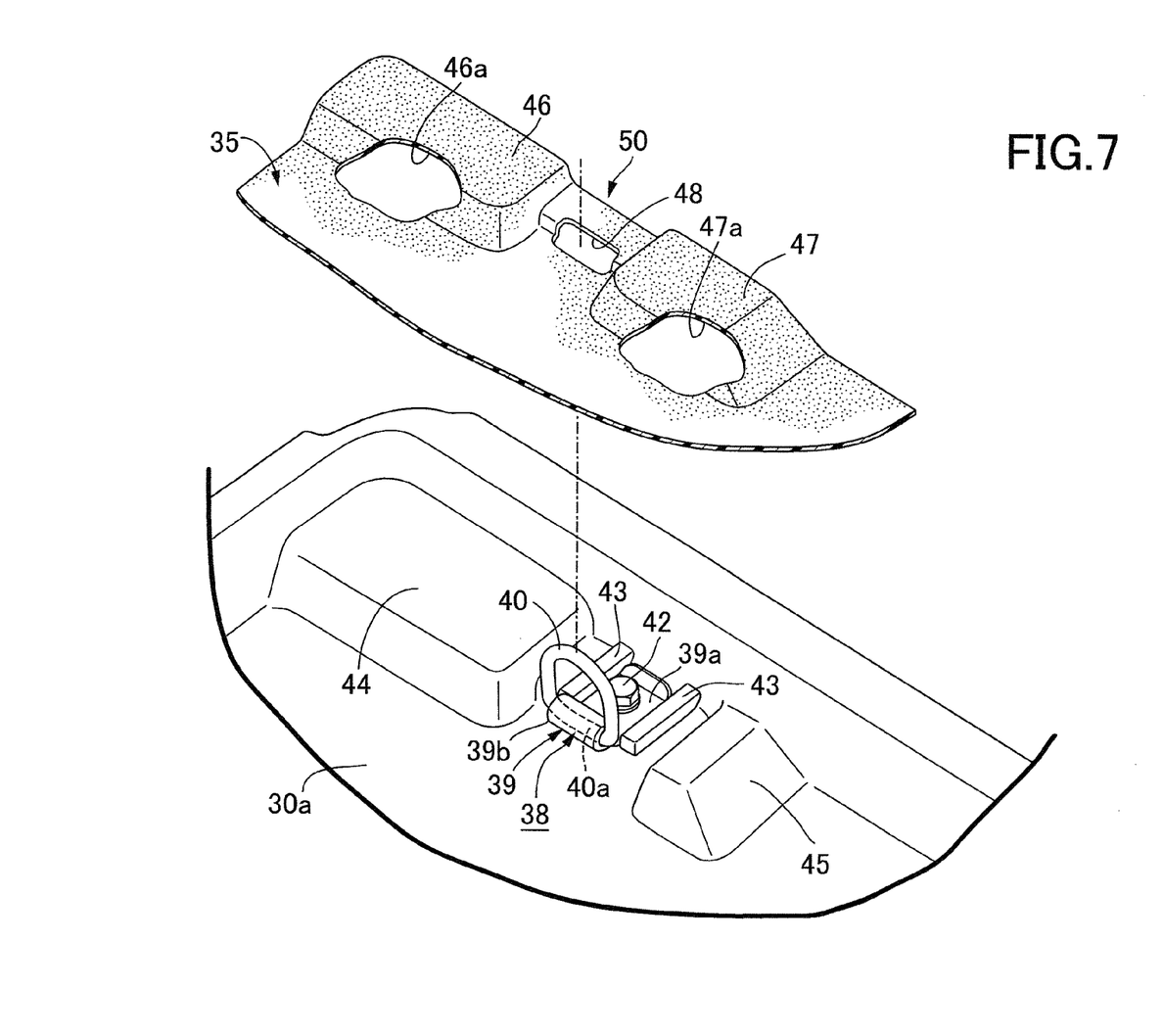
FIG. 7 is an exploded perspective view of floor mat securing means for securing the floor mat on a floor of the loading platform.
Figure 8:
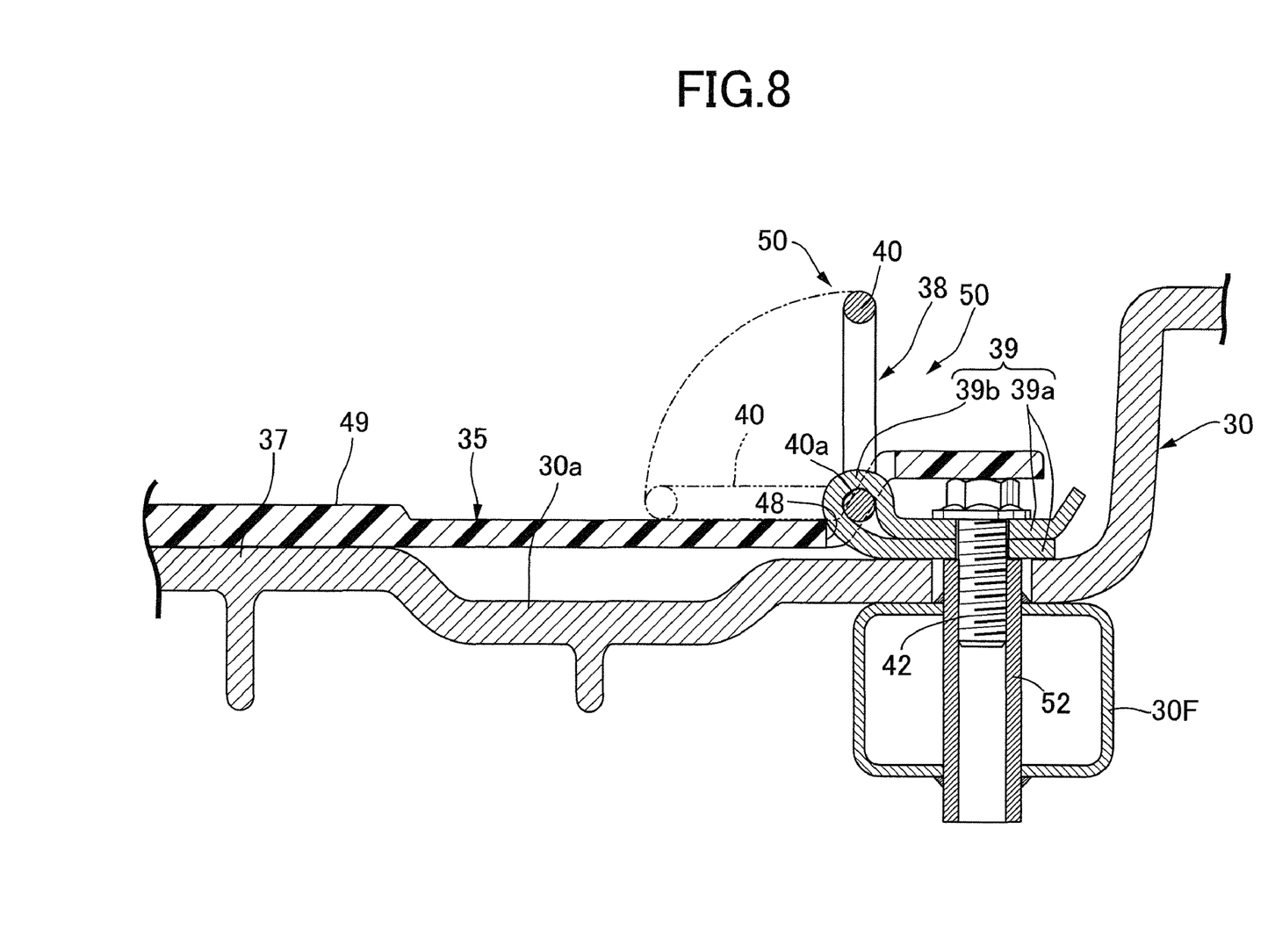
FIG. 8 is an enlarged sectional view taken along the line 8-8 in FIG. 5.

The base portions 39a of the support members 39 are placed so that the boss portions 39b of the left and right load securing tools 38 face each other, and secured to the floor 30a by bolts 42. At this time, each base portion 39a is held between a pair of front and rear positioning pieces 43 and 43 welded to the floor 30a and is prevented from rotating around the bolt 42. Thus, the base portion 39a can be reliably secured to the floor 30a only by single bolt 42.

On an upper surface of the floor 30a, a pair of bumps 44 and 45 are formed that are arranged axially of the boss portion 39b of the load securing tool 38 with the load securing tool 38 therebetween. The bumps 44 and 45 receive a load on the floor 30a when placed immediately above the load securing tool 38 and prevent interference between the load and the load securing tool 38.

As shown in FIGS. 5 to 8, a floor mat for a loading platform 35 is placed on the upper surface of the floor 30a so as to cover the entire surface. The floor mat for a loading platform 35 is made of rubber. At this time, in the floor mat for a loading platform 35, a pair of upper bumps 46 and 47 having, in lower surfaces, recesses 46a and 47a that receive the bumps 44 and 45, respectively, on the floor 30a, and a slot-shaped retaining hole 48 that is formed between the upper bumps 46 and 47 and fits around the boss 39b of the load securing tool 38 without forming clearance. On an upper surface of the floor mat for a loading platform 35, a number of anti-slip protrusions 49, 49 . . . extending in the front and rear direction in positions corresponding to the ribs 37, 37 . . . of on the floor 30a are formed.

Thus, in placing the floor mat for a loading platform 35 on the floor 30a, the hook member 40 of the load securing tool 38 is first kept raised and then passed through the retaining hole 48 in the floor mat for a loading platform 35, and then the retaining hole 48 is caused to fit around the corresponding boss portion 39b. The retaining hole 48 is formed to fit around the boss portion 39b without clearance, and the hook member 40 formed of a D-ring has a width larger than that of the boss portion 39b. Thus, the slot-shaped retaining hole 48 is longitudinally extended when the hook member 40 is passed through the retaining hole 48, and released from the extended state after the passage, then, the retaining hole 48 contracts back to its original shape, and is prevented from coming off the hook member 40.

The hook member 40 protruding upward of the retaining hole 48 is tilted to a horizontal state to hold the floor mat for a loading platform 35 down from above, further preventing the retaining hole 48 from coming off hook member 40, and also preventing the floor mat for a loading platform 35 from rising.

Thus, the plurality of load securing tools 38 and the retaining holes 48 in the floor mat for a loading platform 35 that fit roots of the load securing tools 38 comprise floor mat securing means 50, and the floor mat for a loading platform 35 can be easily secured on the floor 30a by the floor mat securing means 50, and thus can be easily removed. Further, there is no need for special securing members such as screws or rivets. The retaining holes 48 are die-formed simultaneously at the time the floor mat for a loading platform 35 is made of rubber by molding. Thus, inner surfaces of the retaining holes 48 are smooth and have no cut that may cause stress concentration, thereby ensuring durability of the retaining holes 48.

In conventional trucks in which a floor of a loading platform is provided with a load securing tool, a relatively large notch that does not interfere with the load securing tool is generally provided in a floor mat for a loading platform in the case of placing the floor mat for a loading platform on the floor. Thus, a small article (for example, a screw or the like) having fallen on the floor mat for a loading platform may enter between the floor and the floor mat for a loading platform through the notch and be lost. In the present invention, however, the retaining hole 48 in the floor mat for a loading platform 35 fits around the boss portion 39b of the load securing tool 38 without clearance as described above, thereby preventing a small article from passing through the retaining hole 48 and being lost.

In the floor mat for a loading platform 35, the upper bumps 46 and 47 are formed that are raised on the front and rear of the hook member 40 exposed from the retaining hole 48, and receive the bumps 44 and 45 on the floor 30a. Thus, even when a load to be placed on the floor 30a is placed immediately above the load securing tool 38, the upper bumps 46 and 47 receive the load to prevent interference between the load and the load securing tool 38 and prevent damage to the load.

When the load on the floor 30a is easily moved, a rope or the like for retaining the load is threaded through the hook members 40 of the plurality of load securing tools 38 to prevent movement of the load. At this time, a number of anti-slip protrusions 49 and 49 . . . on the floor mat for a loading platform 35 made of rubber provide an anti-slip function and a cushioning function to prevent movement and vibration of the load.

The present invention is not limited to the above described embodiment, and various design choices may be made without departing from the gist of the present invention. For example, the floor mat for a loading platform 35 according to the present invention may be used for a luggage chamber of a passenger automobile. The mat 35 may be made of material having stretchability such as to extend the retaining hole 48 and insert the hook member 40 through the retaining hole 48, and may be made of rubber, woven fabric, resin, and combinations thereof.

What is claimed is:
1. A vehicle comprising:
  a load securing tool including:
    a support member secured to a loading platform of the vehicle, and a hook member supported by the support member, the hook member having a width that is greater than a width of the support member;

a floor mat comprising a covering portion which extends over a floor of the loading platform and a plurality of retaining holes of the covering portion formed near an edge of the floor surface and through which at least one load securing tool is inserted, wherein at least a peripheral portion of each retaining hole is formed with an elastic material that expands when the at least one load securing tool is inserted therethrough;

a bump protruding from the floor of the loading platform at a location corresponding to the load securing tool; and a bump formed an underside of the floor mat as a recess at a portion of the floor mat corresponding to and configured to receive therein the bump of the floor of the loading platform, and wherein each retaining hole has a width that is greater than the width of the support member and less than the width of the hook member.

2. The vehicle according to claim 1, wherein the support member comprises:

a base portion secured to the floor of the loading platform; and a boss portion continuously connected to an end of the base portion.

3. The vehicle according to claim 2, wherein the hook member further comprises a shaft rotatably supported by the boss portion of the support member, wherein the hook member is pivotable between a standing position and a tilted position.

4. The vehicle according to claim 3, wherein the hook member extends through a corresponding retaining hole, and the corresponding retaining hole fits around the boss portion of the support member.

5. The vehicle according to claim 1, further comprising at least one positioning piece fixed to the floor of the loading platform.

6. The vehicle of according to claim 2, further comprising at least one positioning piece fixed to the floor of the loading platform, wherein the at least one positioning piece is adjacent to the base portion.

7. The vehicle of according to claim 6, wherein the at least one positioning piece comprises front and rear positioning pieces, and wherein the base portion is disposed between the front and rear positioning pieces.

* * * * *